W. F. WHITNEY.

Assignor of one-half interest to E. STORM.

Vehicle-Spring.

No. 8,348. Reissued July 23, 1878.

Witnesses

John Becker

Geo. Haynes

Inventor

William F. Whitney by his Attorneys

Brown & Allen

N. PETERS, PHOTO-LITHOGRAPHER, WASHINGTON, D. C.

UNITED STATES PATENT OFFICE.

WILLIAM F. WHITNEY, OF POUGHKEEPSIE, NEW YORK, ASSIGNOR OF ONE-HALF INTEREST TO EDWARD STORM, OF SAME PLACE.

IMPROVEMENT IN VEHICLE-SPRINGS.

Specification forming part of Letters Patent No. 169,323, dated October 26, 1875; Reissue No. 8,348, dated July 23, 1878; application filed April 18, 1878.

*To all whom it may concern:*

Be it known that I, WILLIAM F. WHITNEY, of Poughkeepsie, in the county of Dutchess and State of New York, have invented a new and useful Improvement in Springs for Vehicles, of which the following is a description, reference being had to the accompanying drawing, forming part of this specification.

This invention relates to springs for side-bar wagons; and it consists in a certain combination of parts, whereby the application of torsion-springs to a side-bar wagon is accomplished in a simple and economical manner, and a strong and durable vehicle is produced.

Figure 1:
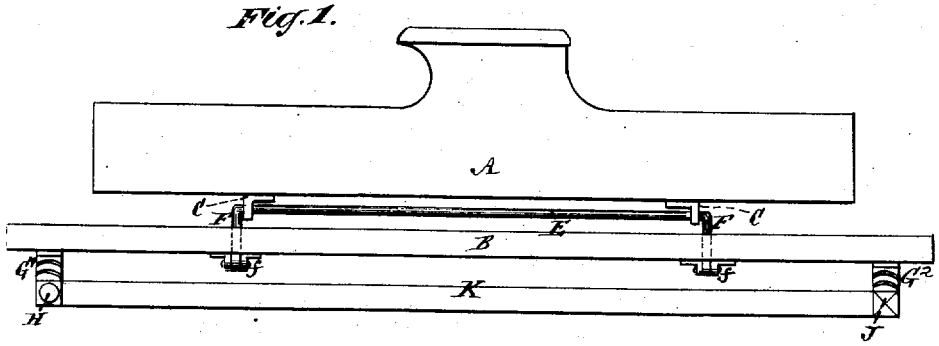
Figure 2:
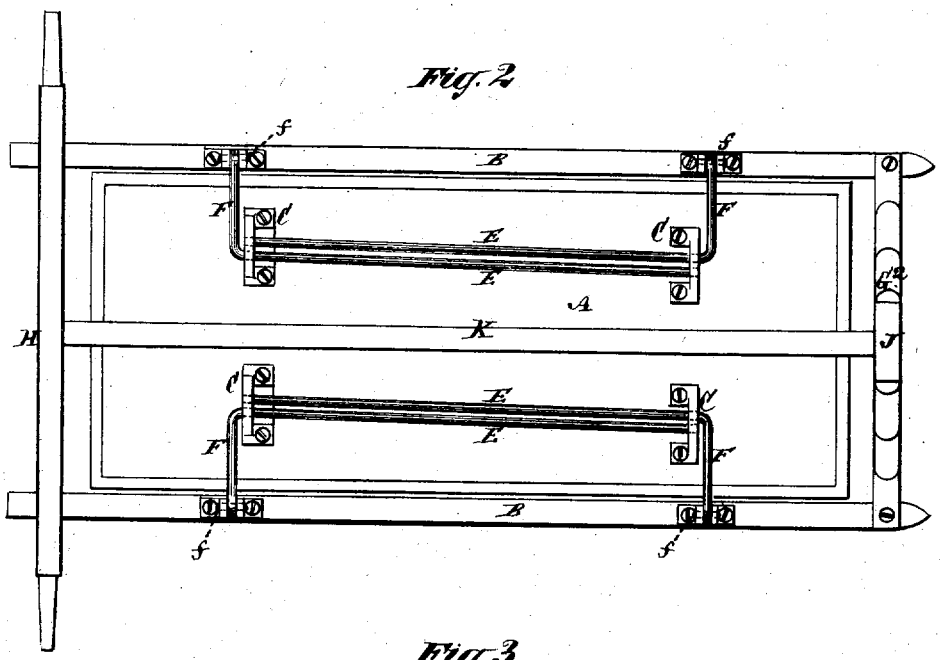
Figure 3:
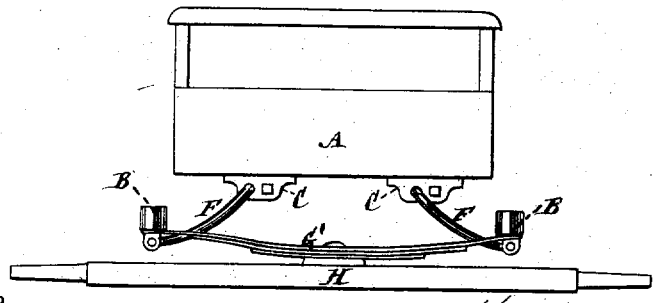

In the accompanying drawing, Figure 1 is a side view of a side-bar wagon in part embodying my invention. Fig. 2 is an inverted plan or under view of the same, and Fig. 3 an end view thereof.

A represents the body of a side-bar wagon, and B B its side bars. E E are elastic steel rods or bars secured to the body of the wagon so as to admit of their torsional action, and connected with the side bars B B by arms F F, which are here shown as applied to one end of either torsion-rod. Each rod or bar E and its arm F constitute one torsion-spring.

The torsion-rods E E are here represented as applied to the body of the wagon as follows: C C are metallic brackets, having perforated lugs at their ends for securing them to the bottom of the body A by means of screws or bolts. Intermediately of the ends of each bracket are two holes, one of which is formed to receive and to hold from turning within it the polygonal end of a torsion-rod, E, and the other one of which is formed to allow of the turning of the opposite end of a corresponding rod within it. This construction of the bracket is especially designed for an arrangement of torsion-springs in pairs on both sides of the longitudinal center of the wagon-body, and in which one end of each torsion rod or bar is secured to said body, and its other end is connected with the side bar of the wagon. Thus there are here shown four of said brackets—that is, two near the front end and two near the rear end—in parallel directions transversely to the length of the body, and the torsion-rods E E are applied to said brackets by inserting the polygonal end of each rod in a hole of corresponding shape in one of the brackets, while the opposite end of the same rod is loose or free to turn in another of the brackets as a bearing, and beyond which latter bracket the rod is made to slightly project for the purpose of connecting it with the side bar by an arm, F. The torsion-rods E E on either side of the body are here represented as so arranged that the polygonal end of one rod engages with the bracket toward the front end of the body, and the polygonal end of the other rod with the bracket toward the rear end of the body, so that the ends of the rods which are not thus held are toward opposite ends of the body. The arms F, which connect the free or loose ends of the rods E with the side bars of the wagon, may be formed by suitably bending said ends of the rods when they are made to project beyond the brackets which carry them, as shown in the arrangement represented in the drawing. The outer ends of these arms F are connected with the side bars B in any suitable manner. They are herein shown as connected by means of a pin, *f*, forming a flexible joint; but they may be attached by means of links or by arranging the ends of the arms to slide in sockets attached to the side bars, a flexible joint being formed in either case.

The ends of the side bars B may be connected by semi-elliptical or flexion springs $G^1$ $G^2$, the rear spring, $G^1$, being attached directly to the rear axle, H, and the front spring, $G^2$, having the bolster J attached to it. The ends of the springs $G^1$ $G^2$ are herein shown as rigidly attached to the bars B B, but they may be attached by means of hinges or links, or in any other manner which will allow the bars to rock when the body A rises and falls.

As shown in the drawings, the brackets C are narrow, and the attachment of the rods E is close to the bottom of the body A, so that when in its normal position the bottom of the body is on a higher level than that of the point of connection of the arms F to the side bars B; but the brackets C may be of such width as to extend downward sufficiently far to place the body A in its normal position on a lower level than that of the bars B, in which case the arms F will be inclined upward from the brackets instead of downward, as herein shown.

The rear axle, H, and bolster J may be connected by a reach, K. Although two torsion-springs are here shown as used on each side of the wagon, the invention is not restricted to any particular number of such springs, as there may be one or more of said springs on each side, each consisting of a torsion rod or bar secured to the body of the wagon and arranged lengthwise of the same, and an arm connecting said rod with the side bar of the vehicle.

By the use of torsion-springs, as herein described, arranged lengthwise of the wagon-body and supported directly upon or suspended directly from the side bars, and directly supporting the wagon in such manner as to bring the torsion-bearing of the spring directly upon its connection with the side bar, I obtain a very simple application of the torsion-spring to the side-bar wagon.

I claim—

1. The combination, with the body and side bars of a side-bar wagon, of torsion-springs consisting of torsion rods or bars and attached arms, the said rod or bar and arm of each spring being connected one with the body and the other with one of the side bars, substantially as herein described.

2. The combination, with the body and side bars of a side-bar wagon, of a torsion-spring consisting of a torsion rod or bar and an attached arm, when the said rod or bar is arranged lengthwise of the body and the said arm is connected with the side bar, substantially as herein described.

3. The combination, with the body and side bars of a side-bar wagon, of two or more torsion-springs, each applied to act independently of the other or others between the body and one of the side bars, substantially as herein described.

4. The combination, with the body and one of the side bars of a side-bar wagon, of a torsion-spring consisting of a torsion rod or bar, one end of which is rigidly secured to the body of the wagon and the other end of which is furnished with an arm, which is connected with the side bar, substantially as herein described.

5. The combination of a torsion-spring, one end of which is rigidly secured to the bottom of the body of a side-bar wagon and the other end of which is furnished with an arm attached to one of the side bars of the said wagon, and a bearing attached to the said body for the support of the said spring near the said arm in such manner as to permit the said spring to turn or twist freely, substantially as herein described.

6. The combination, with the side bars, the body, and the axle or bolster of a side-bar wagon, of torsion-springs applied between the body and side bars and semi-elliptical or flexion springs applied between the side bars and the axle or bolster, substantially as herein described.

WILLIAM F. WHITNEY.

Witnesses:
HENRY T. BROWN,
VERNON H. HARRIS.